United States Patent
Giron et al.

(10) Patent No.: US 10,764,703 B2
(45) Date of Patent: Sep. 1, 2020

(54) ACOUSTIC METAMATERIAL DEVICE, METHOD AND COMPUTER PROGRAM

(71) Applicant: Sony Corporation, Tokyo (JP)

(72) Inventors: Franck Giron, Stuttgart (DE); Fabien Cardinaux, Stuttgart (DE); Thomas Kemp, Stuttgart (DE); Stefan Uhlich, Stuttgart (DE); Marc Ferras Font, Stuttgart (DE); Andreas Schwager, Stuttgart (DE); Patrick Putzolu, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/362,692

(22) Filed: Mar. 25, 2019

(65) Prior Publication Data

US 2019/0306649 A1 Oct. 3, 2019

(30) Foreign Application Priority Data

Mar. 28, 2018 (EP) .................................. 18164551

(51) Int. Cl.
*H04S 7/00* (2006.01)
*G06F 17/11* (2006.01)
*H04R 3/04* (2006.01)

(52) U.S. Cl.
CPC .............. *H04S 7/301* (2013.01); *G06F 17/11* (2013.01); *H04R 3/04* (2013.01); *H04S 2420/01* (2013.01)

(58) Field of Classification Search
CPC H04R 3/04; H04R 3/005; H04S 7/301; H04S 2420/01; H04S 7/307

USPC ................................................ 381/92, 58–59
See application file for complete search history.

(56) References Cited

U.S. PATENT DOCUMENTS

| | | | |
|---|---|---|---|
| 2013/0100233 A1 | 4/2013 | Turqueti et al. | |
| 2015/0163593 A1* | 6/2015 | Florencio | G10K 11/16 381/66 |
| 2016/0044417 A1 | 2/2016 | Clemen, Jr. | |
| 2017/0078820 A1 | 3/2017 | Brandenburg et al. | |
| 2018/0213348 A1* | 7/2018 | Natarajan | H04W 4/70 |
| 2019/0110153 A1* | 4/2019 | Pearson | H04R 5/04 |

FOREIGN PATENT DOCUMENTS

| | | |
|---|---|---|
| CN | 104469581 A | 3/2015 |
| KR | 2017064219 A | 12/2018 |

OTHER PUBLICATIONS

"Yangbo Xie, Single-sensor multispeaker listening with acoustic metamaterials, Aug. 2015, PNAS, vol. 112, pp. 10595-10597".*

(Continued)

*Primary Examiner* — Disler Paul
(74) *Attorney, Agent, or Firm* — Xsensus LLP (57) ABSTRACT

A device for room geometry analysis comprising: a plurality of segments (101-106) built of acoustic metamaterials, each segment ($\varphi$, $\theta$) acting as a waveguide with a unique transfer function (B($\varphi$, $\theta$, $\omega$)); and a processor configured to calculate delays ($\tau(\varphi, \theta)$) and respective directions ($c(\varphi, \theta)$) of mirror sound sources (721-725) by decomposing a sound signal ($\hat{S}$) obtained from a microphone (110) based on the transfer functions (B($\varphi$, $\theta$, $\omega$)) of the segments (101-106) and based on a calibration signal (tsp(t)) emitted by a speaker (420).

16 Claims, 8 Drawing Sheets

(56) References Cited

OTHER PUBLICATIONS

Yirka, B., et al., "New Metamaterial Device Solves the Cocktail Party Problem", Phys.Org, 5 Pages total, (Aug. 11, 2015).
Han, M., "Sound Reduction by a Helmholtz Resonator", Lehigh Preserve Theses and Dissertations, 110 Pages total, (Sep. 2008).
Xie, Y., et al., "Single-sensor Muitispeaker Listening with Acoustic Metamaterials", PNAS, vol. 112, No. 34, pp. 10595-10598, (Aug. 25, 2015).

* cited by examiner

ACOUSTIC METAMATERIAL DEVICE, METHOD AND COMPUTER PROGRAM

CROSS-REFERENCE TO RELATED APPLICATION

The present application claims priority to European Patent Application 18164551.6 filed by the European Patent Office on Mar. 28, 2018, the entire contents of which being incorporated herein by reference.

TECHNICAL FIELD

The present disclosure relates to the field of acoustics, in particular to a device for acoustic room analysis, a corresponding method for acoustic room analysis, and a computer program for acoustic room analysis.

TECHNICAL BACKGROUND

For many algorithms in acoustics, like e.g. beam forming, dereverberation, and more, an analysis of the room, e.g. an estimation of the geometry of the room, is required. However, asking a user to enter the dimensions of the room is impractical. Acoustic measurements, such as impulse response, to determine room geometries are difficult and typically require that the sound emitter and/or the measurement microphone are physically moved or turned to point in different directions, which necessitates the usage of a gimbal or a turntable.

The present disclosure enhances acoustic room analysis and room geometry estimation.

SUMMARY

Brief Description of the Drawings

Embodiments are explained by way of example with respect to the accompanying drawings, in which.

DETAILED DESCRIPTION OF EMBODIMENTS

Figure 1:
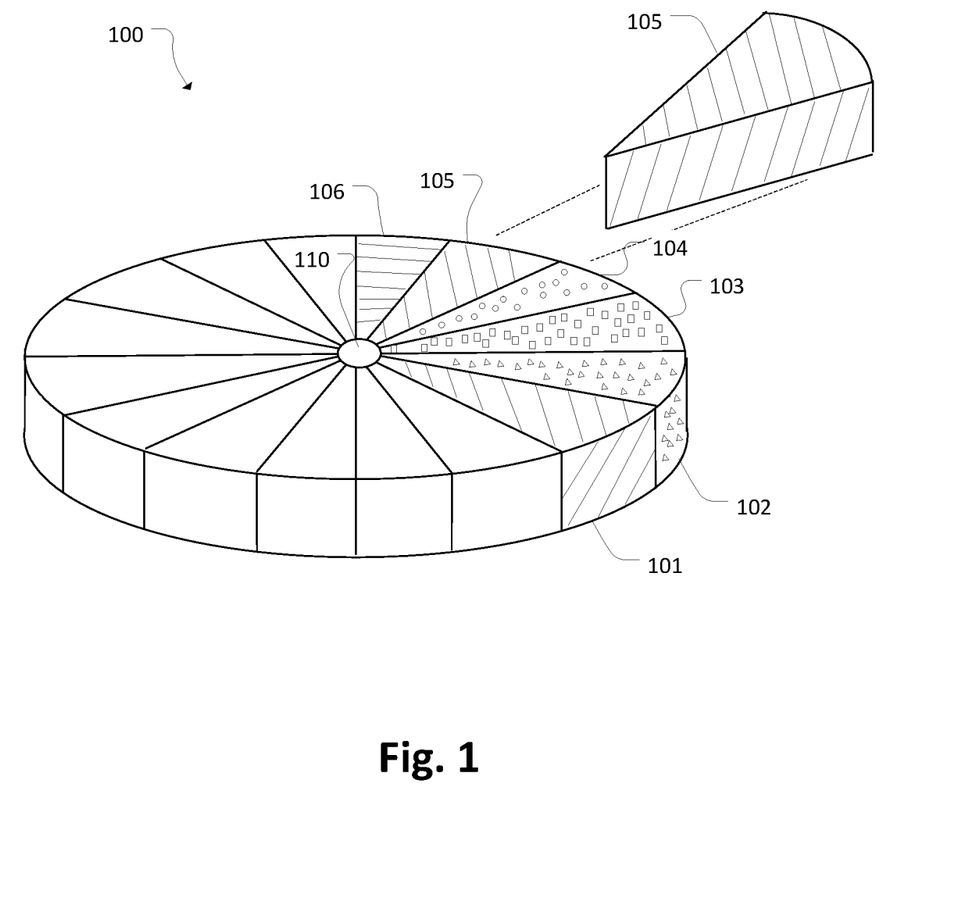
FIG. 1 visualizes a microphone surrounded by different slices of acoustic metamaterial according to the device of the present disclosure.

Before a detailed description of the embodiments under reference of FIG. 1 is given, general explanations are made.

The embodiments disclose a device for room geometry analysis comprising: a plurality of segments built of acoustic metamaterials, each segment acting as a waveguide with a unique transfer function; and a processor configured to calculate delays and respective directions of mirror sound sources by decomposing a sound signal obtained from a microphone based on the transfer functions of the segments and based on a calibration signal emitted by a speaker.

The sound signal captured by the microphone is the sum of all incoming sound passing the segments and therefore it is the sum of all reflections of the calibration signal, as the calibration signal travels from the speaker to the microphone on many ways: directly, by first order reflection and by higher order reflections. Each reflected signal passes a different segment due to the room geometry and the reflection geometry resulting of the room geometry.

A mirror sound source captured by the microphone is for example generated when the calibration signal is reflected at a wall. For example, the calibration signal may be reflected by walls of a room and travel from the reflecting walls directly or with additional reflections to the metamaterial device. Reaching the metamaterial device, the reflected calibration signal passes at least one segment of the metamaterial device and reaches the microphone.

A segment may be made of any metamaterial with a known transfer function and may have any shape and structure. A segment may for example be structured to provide a specific and unique transfer function. A metamaterial can for example be produced with acrylonitrile butadiene styrene plastics using fused filament fabrication 3D printing technology. There are many possibilities for metamaterial composition and structure known to the skilled person.

Figure 3:
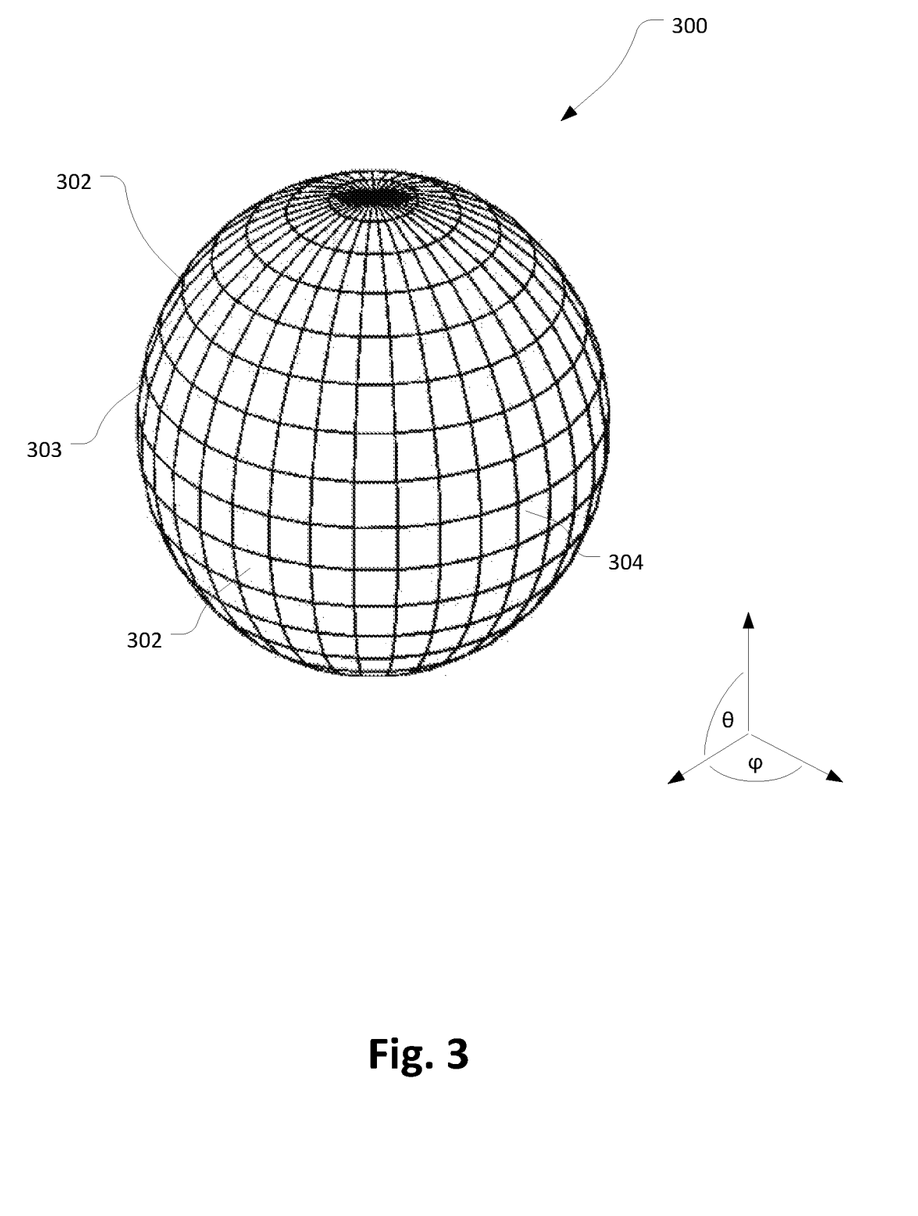
FIG. 3 shows a 3D meta material device (MMD)

At least one of the segments (301-304) may be a Helmholtz resonator.

A transfer function is a mathematical function giving the corresponding output value for each possible value of the input to the object to which the transfer function relates. For example, a transfer function may define a frequency-dependence of the transmitted amplitude of a sound signal passing the segment built of acoustic metamaterials.

The microphone that captures the sound signal may for example be placed so that it is surrounded by the segments, e.g. in the center of the metamaterial device. The segments may for example be arranged around the microphone in a cylindrical, spherical, circular, cubic, cuboid or planar shape. The microphone may for example be a single microphone, e.g. an omnidirectional microphone, or a microphone array.

The speaker may be any type of omnidirectional speaker known to the skilled person, for example an array of dynamic or electrostatic loudspeaker, one single dynamic loudspeaker or a piezo loudspeaker.

The processor may be a CPU, a microcomputer, a computer, or any other circuit configured to perform calculation operations.

The processor may be configured to determine, for each delay and the respective direction, the location of a mirror sound source based on the delay and the respective direction.

The processor may be configured to determine the directions of mirror sound sources from angle-dependent amplitude coefficients of the sound signal captured by the microphone. For example, each angle-dependent amplitude coefficient may be identified as a signal related to a mirror sound source.

The processor may be configured to determine a normal vector of a wall and a wall point based on the location of the mirror sound sources and the location of the loudspeaker. The normal vector and one point on a plane uniquely define a plane in a 3-dimensional space. The normal vector and the wall point thus can define a wall of a room that is to be acoustically analyzed.

The calibration signal may for example have a flat spectral density or the calibration signal may be a time-stretch pulse signal. Time-stretch pulse signals are known to the skilled person. The skilled person may use any technique to generate a time-stretch pulse signal, that he or she prefers.

The processor may be configured to decompose the sound signal based on compressive sensing (CS) techniques. Any compressive sensing techniques like L1-norm minimization, Edge-preserving total variation, Iterative model using a directional orientation field and directional total variation or the like may be used for decomposing the sound signal.

The processor may be configured to decompose the sound signal based on the minimization of the L1 norm of the sound signal, e.g. of coefficients of a decomposition of the sound signal.

The processor may be configured to optimize an error function.

The processor may be configured to decompose the sound signal based on additional constraints. Additional constraints may be the suppression of spurious reflections from furniture etc., and they are added to the calculation to improve the robustness of the approach.

The embodiments also disclose a system comprising a device as describe above and in the embodiments below, and a speaker, the speaker being configured to emit a calibration signal. The speaker may for example be placed in a room some distance away from the device comprising the segments and the microphone.

The embodiments also disclose a method comprising: emitting a calibration signal; obtaining a sound signal; and calculating delays and respective directions of mirror sound sources by decomposing the sound signal based on the transfer functions of a plurality of segments and based on the calibration signal, the segments built of acoustic metamaterials, each segment acting as a waveguide with a unique transfer function.

The embodiments also disclose a program comprising instructions, which when executed on a processor: emit a calibration signal; obtain a sound signal; and calculate delays and respective directions of mirror sound sources by decomposing the sound signal based on the transfer functions of a plurality of segments and based on the calibration signal, the segments built of acoustic metamaterials, each segment acting as a waveguide with a unique transfer function.

Metamaterial Device (MMD)

FIG. 1 visualizes a microphone surrounded by different slices of acoustic metamaterial that constitute a metamaterial device (MMD). The metamaterial device is configured similar to the material device called "metamaterial multispeaker listener" which is disclosed by Yangbo Xie at al. in "Single-sensor multispeaker listening with acoustic metamaterials", Proceedings of the National Academy of Science of the United States of America (PNAS), Aug. 25, 2015. 112 (34) 10595-10598. The metamaterial device separates simultaneous overlapping sounds from different sources by exploiting acoustic metamaterials and compressive sensing.

The metamaterial device 100 comprises acoustic metamaterials. The acoustic metamaterials are arranged in a special structure with desired acoustic properties. The metamaterial is arranged around a microphone 110 in segments (here "slices") 101, 102, 103, 104, 105, 106. Each segment is a fanlike region of different metamaterial structure functioning as waveguide for sound with a unique transfer function, that is dependent on the solid angle (azimuth and elevation) of the slice. Each segment (waveguide) possesses a unique and highly frequency-dependent response. The transfer function of each segment is known and all transfer functions are substantially different from each other. The different transfer functions result in a "coloring" of sounds received by the microphone 110 depending on the segment by which the sound is received. This "coloring" allows identifying the segment, respectively, the direction from which a sound has been received.

The spatial resolution of the metamaterial device 100 depends on the total number of segments. FIG. 1 shows a metamaterial device 100 with sixteen different segment (slices). Therefore, the metamaterial device 100 has a radial resolution of 360°/16=22.5°. For a better spatial and radial resolution, other numbers of segments such as 36 different slices or the like could be used. Such a device would have a radial resolution of 360°/36=10°. The geometry of the segments, the arrangement of the segments and the total number of segments is not limited to the examples given in this description.

The metamaterial device 100 can for example be produced with acrylonitrile butadiene styrene plastics using fused filament fabrication 3D printing technology. It should be mentioned that there are many possibilities for metamaterial fabrication. Every kind of material with known transfer function, or any material forming a Helmholtz resonator, can be used for the metamaterial device 10.

In the embodiment of FIG. 1 the metamaterial device has a disk-like shape. The skilled person will readily appreciate that the metamaterial device can also be of cubic, spherical or cuboid or any other geometrical shape.

Figure 2:
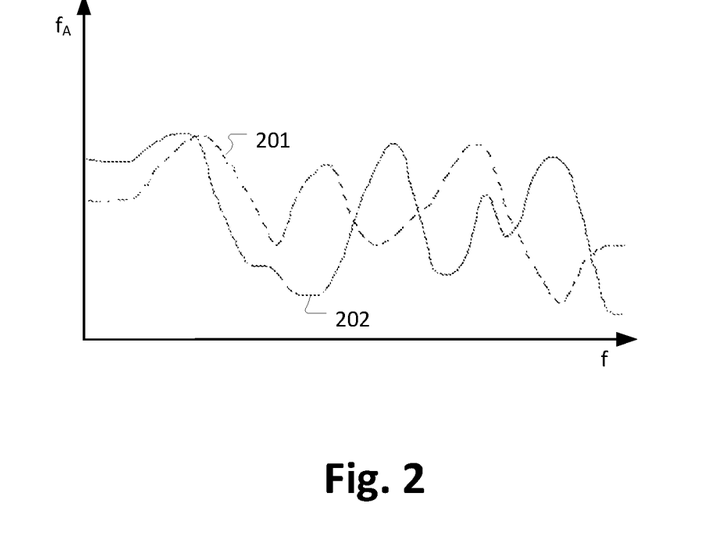
FIG. 2 visualizes the different transfer functions in the frequency domain of two different slices of metamaterial surrounding the microphone presented in FIG. 1.

FIG. 2 visualizes two different transfer functions in the frequency domain of two different segments of metamaterial surrounding the microphone presented in FIG. 1. Each segment/waveguide possesses a unique and highly frequency-dependent response, which is generated by the resonators with predefined resonant dispersion. The transfer function (here, the frequency response) of the slices 101 and 102 in FIG. 1 is plotted as graphs 201 and, respectively, 202. The diagram plots the frequency modulation amplitude (measured in dB) $f_A$ over frequency $f$. The transfer function represents a relation between the frequency $f$ of an incoming signal and the amplitude $f_A$ of the sound signal captured by the microphone at the waveguide exit. As the slices have an individual transfer function $f_A(f)$, the sound signals are "colored" differently depending on the segment they have passed.

FIG. 3 shows a metamaterial device that is configured to estimate a room geometry in three dimensions. The metamaterial device 300 consists of segments 301, 302, 303, 304, etc. and has a microphone within his core (not shown here). The metamaterial device 300 is of spherical geometry and possesses a resolution of 36 different elevation angles φ and an azimuthal resolution 18 different azimuth angles θ. This is equal to a 10-degree resolution in both polar directions. Therefore, in sum, there are 18*36=648 different segments. Each segment has an individual transfer function so that the sound signals are "colored" differently depending on the segment they have passed. As in the case of the metamaterial device 100 of FIG. 1, a microphone is placed in the center of the segments. This three dimensional metamaterial device 300 is the basis for the further description of a process of estimating a room geometry.

Estimating a Room Geometry with a Metamaterial Device

Figure 4:
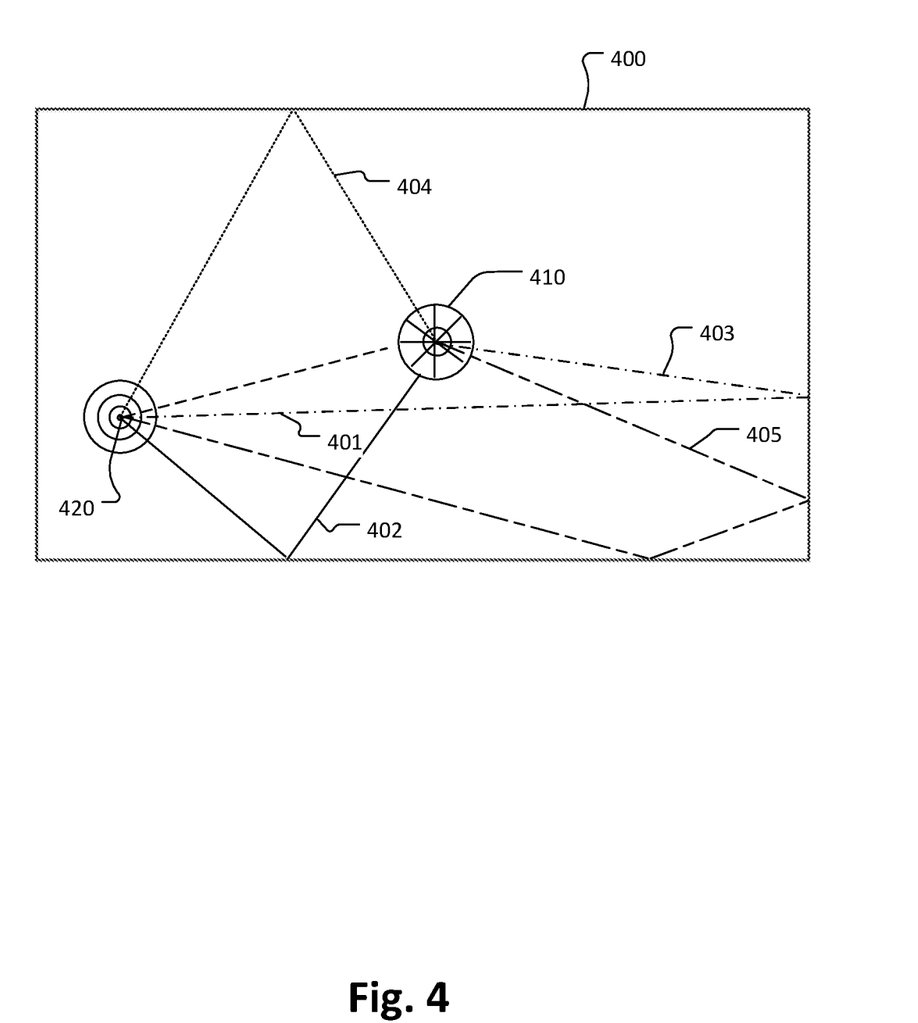
FIG. 4 visualizes the principle of room estimation and room geometry analysis performed according to data collected by the microphone presented in FIG. 1.

FIG. 4 schematically visualizes the principle of room geometry estimation based on data collected by the metamaterial device presented in FIG. 1. A loudspeaker 420 is disposed in a room and emits a calibration signal, e.g. a time-stretch pulse signal (tsp) or another wide-frequency range signal. Sound emitted by loudspeaker 420 travels directly to the metamaterial device 410 (direct path 401). Still further sound emitted by loudspeaker 420 is reflected from the walls of the room 400. The reflections 402, 403, 404, 405 reach the metamaterial device 410 with a delay corresponding to the travelling distance of the sound, divided by $c_s$, the speed of sound. Each of the reflected waves reaches the metamaterial device 410 from a different direction, and hence, travels through a different segment of the metamaterial device 410. Here, three primary reflections with only one reflection 402, 403, 404 are drawn and one reflection of a higher reflection order 405 is shown.

Using Helmholtz Resonators as Segments

Figure 5A:
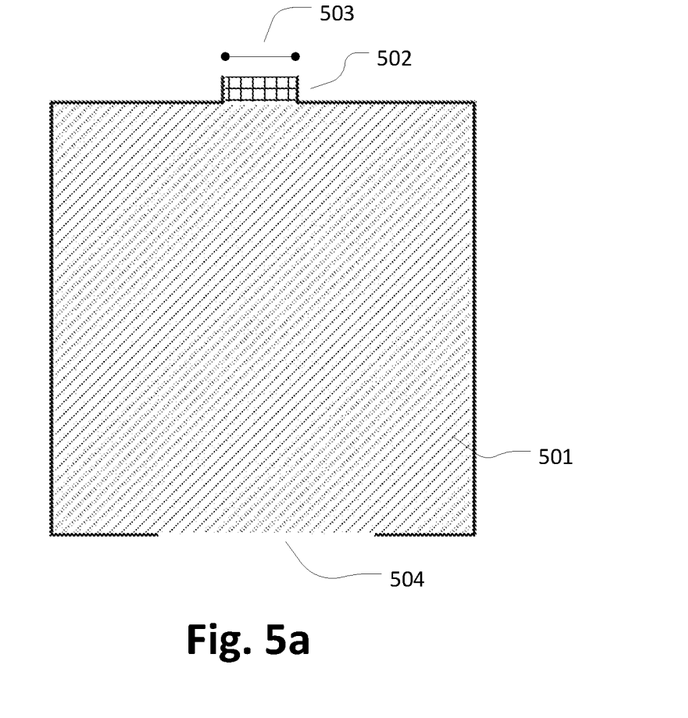
FIG. 5*a* and FIG. 5*b* visualize the principle of a Helmholtz resonator.
Figure 5B:
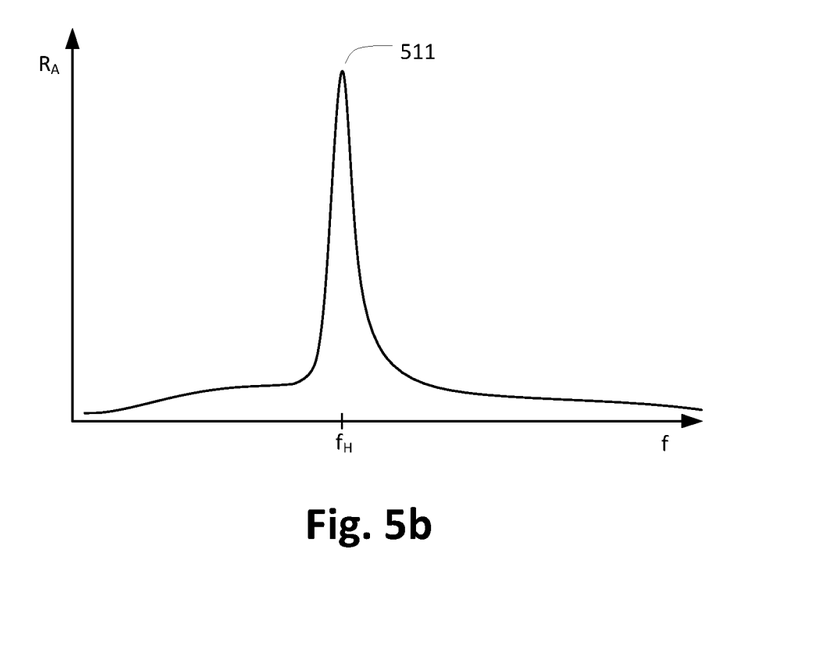

FIG. 5*a* and FIG. 5*b* visualize the principle of a Helmholtz resonator. FIG. 5*a* shows the structure of a Helmholtz resonator. A Helmholtz resonator is an apparatus that is able to pick out specific frequencies of a complex sound. The Helmholtz resonator consists of a rigid container 501 of a known volume $V_0$, nearly spherical or cubic in shape, with a small neck open 502 with a cross-sectional area $S_0$ 503 and a larger hole in the other end 504 to emit the sound.

The air in the neck open 502 forms an inertial mass-system because of the air's own inertial mass. Combined with the elasticity of the volume of the rigid container $V_0$ the hole resonator forms a mass-spring system and hence a harmonic oscillator. For a spherical volume $V_0$ and approximately for a cubic volume $V_0$ the mass-spring system has exactly one resonance frequency that can be calculated as $$f_H = \frac{c_s}{2\pi} \cdot \sqrt{\frac{S_0}{V_0 \cdot L_{eq}}}$$

With the speed of sound $c_s$ in the gas filling the rigid container (mostly air), and the so called equivalent length $L_{eq}$ of the neck with end correction, which can be calculated as $L_{eq}=L+0.3\,D$, where L is the actual length of the neck and D is the hydraulic diameter of the neck.

FIG. 5*b* shows the resonance profile of a Helmholtz resonator. The diagram plots the resonance amplitude of the sound emitted by the larger hole 504 after passing the Helmholtz resonator, if a sweep with constant amplitude is injected into the open neck of the Helmholtz resonator. The resonance profile exhibits a significant peak 511 at the resonance frequency $f_H$ of the Helmholtz resonator. For an ideal Helmholtz resonator the frequency part of the transfer function $B(\varphi, \theta, \omega)$ in the frequency domain is the delta distribution $$B(\varphi,\theta,\omega) = \tilde{B}(\varphi,\theta) \cdot \delta(\omega - \omega_H)$$

With $\tilde{B}(\varphi, \theta)$ the angular part of $B(\varphi, \theta, \omega)$ and $\omega_H = 2\pi \cdot f_H$.

This makes the Helmholtz resonator a good candidate for the segments of the metamaterial device as here the transfer functions of the different segments can be chosen with different resonance frequencies making the basis functions orthogonal to each other (separated in frequency) and therefore the decomposition becomes trivial. The resulting measured transfer function will then be composed of a series of tones at the resonator frequencies and delays, where the maximum energy is coming from the corresponding direction.

By using successively a series of band-pass filters, which preserves only the corresponding resonator frequencies, the delay and direction can be directly estimated from each maxima.

Process Description

As shown in FIG. 4 the calibration signal travels to the metamaterial device on many ways, being reflected by one or more walls. Each segment of metamaterial has its own characteristic transfer function $T_{a,e}$ (which depends on azimuth and elevation), therefore, every segment of metamaterial colors the signal in a unique way. As the total signal captured at the microphone in the metamaterial device is the sum of all reflections, each of which is individually colored by the respective segments, the decomposition of the summary signal (the signal of the microphone) into its constituent colored components based on the transfer functions of the respective segments provides the amplitudes of reflections of the calibration signal. If one assumes that all received signals are first reflections of a surface, by cross-correlating the signal with the highest amplitude (corresponding to the direct sound) with the constituents, one can estimate the corresponding delay.

The decomposition of the sum signal captured by the microphone can be done analogous to the decomposition in the case of compressive sensing (CS), i.e. the L1 norm of the decomposition is minimized. Different to the case of CS, the system of the basis functions is essentially known, since it contains the transfer functions for all azimuth/elevation solid angles, or equivalently, the transfer functions of each of the segments of the acoustic metamaterial. This knowledge of the basis functions is simplifying the decomposition process significantly. The process is even more simplified by the fact that it is possible to control the basis functions. Below, a choice for the basis function is given that makes the decomposition very easy. An example of a procedure to decompose the microphone signal is as follows:

Suppose the transfer function of the segment of the acoustic metamaterial in the frequency domain, corresponding to the azimuth and elevation directions $(\varphi,\theta)$, is denoted $B(\varphi,\theta,\omega)$ and its time domain fourier transform is denoted $b(\varphi,\theta,t)$.

The signal $s(\varphi,\theta,t)$ arriving from direction $(\varphi,\theta)$ defined by the respective segment can be written as a delayed and attenuated version of the time-stretch pulse signal signal $tsp(t)$ emitted by the speaker: $s(\varphi,\theta,t)=tsp(t-\tau)\,c(\varphi,\theta)$ where $\tau$ is the delay (caused by the time the sound wave takes to travel from the speaker to the microphone) and $c(\varphi,\theta)$ are angle-dependent amplitude coefficients that describe the attenuation function that is a function of the room wall reflections and hence the angles $(\varphi,\theta)$ and also the distance traveled by the sound wave (hence, both factors depend, except for the direction of the direct path between speaker and microphone, on the geometry of the room). Note that in this example, only first order reflections are considered. Second order (multiple) reflections coming from the same direction could however be modeled as an additional term, with a different and a different $c(\varphi,\theta)$.

The arriving sound wave from direction $(\varphi,\theta)$ is spectrally modified by the metamaterial with its transfer function $b(\varphi,\theta,t)$, which can be expressed as a convolution product $s(\varphi,\theta,t)*b(\varphi,\theta,t)$, or equivalently as $(tsp(t-\tau)\,c(\varphi,\theta))*b(\varphi,\theta,t)$ which is the same as $$c(\varphi,\theta)(tsp(t-\tau)*b(\varphi,\theta,t))$$

The total sound signal $\hat{S}$ arriving at the microphone (S2 of FIG. 6) and captured by the microphone is the sum of all incoming sound waves from all directions, or $$\hat{S} = \sum_{\varphi,\theta} c(\varphi,\theta)(tsp(t - \tau(\varphi,\theta)) * b(\varphi,\theta,t)) \quad [1]$$

In this equation, the angle-dependent amplitude coefficients $c(\varphi, \theta)$ and the delays $\tau(\varphi, \theta)$ are the desired parameters that allow to estimate the shape of the room, and $\hat{S}$ is an estimate of the measured microphone signal. The $b(\varphi, \theta, t)$ are the known parameters of the metamaterial for the respective angle. Note that $\tau(\varphi, \theta)$ is expressed as a function of the angle. The summation over the room angle $(\varphi, \theta)$ is done over as many discrete angles as there are discrete segments in the acoustic metamaterial device, i.e. 36 values of $\varphi$, and 18 values of $\theta$ if the angular resolution of the metamaterial is 10 degrees. In such a layout, the sound signal $\hat{S}$ captured by the microphone is seen as the sum of 36*18 or 648 constituents.

Figure 6:
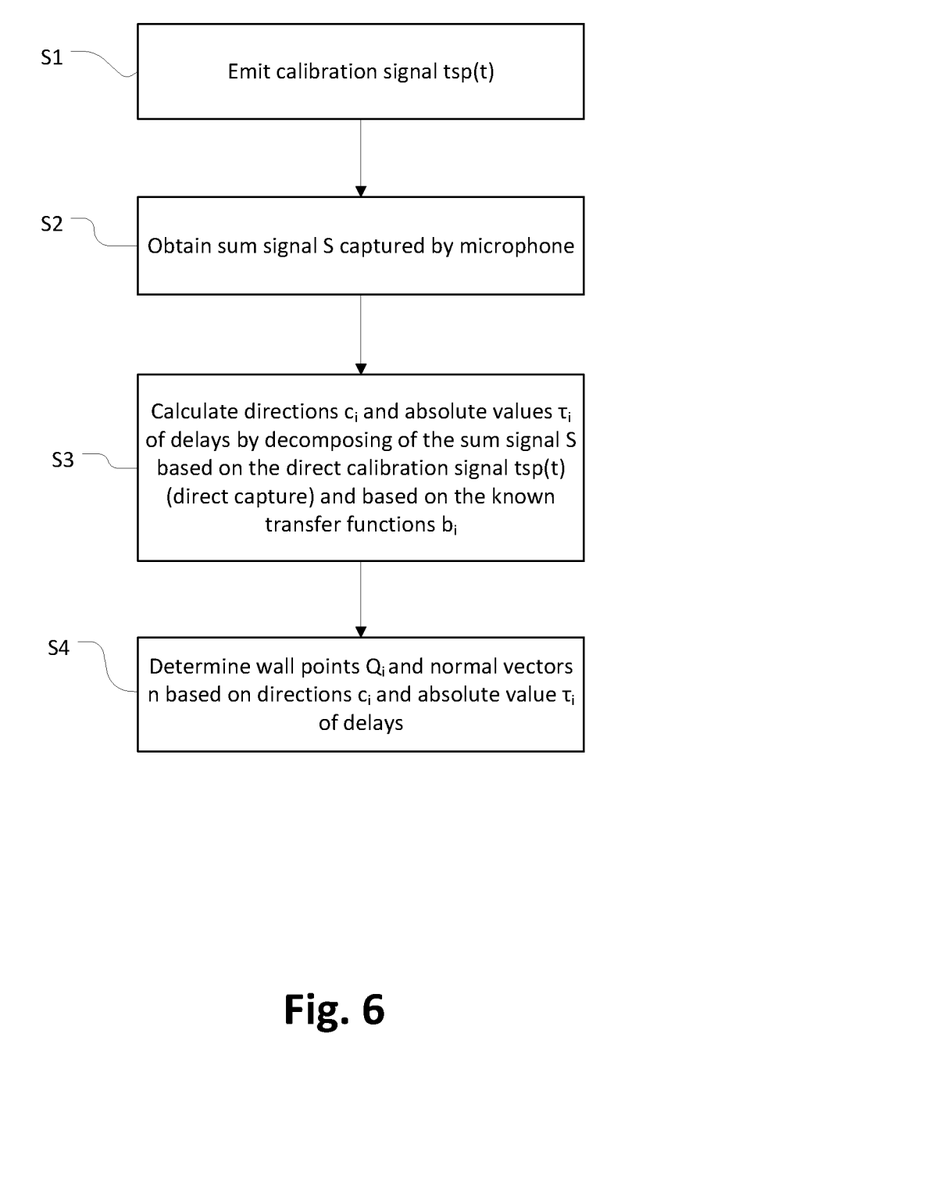
FIG. 6 is a flowchart visualizing the working principle of the present disclosure.

Equation [1] is solved for the angle-dependent amplitude coefficients $c(\varphi,\theta)$ and the respective delays $\tau(\varphi, \theta)$ (S3 in FIG. 6). In general, and in the presence of inevitable measurement noise, there is no exact solution, and the best possible approximate solution typically contains contributions from all 648 constituent terms. However, since it is known that there are only a couple primary reflections (e.g. 402, 403, 404 in FIG. 4) that are contributing the bulk of the input, an additional constraint of L1 minimization is added to [1]. Instead of minimizing the estimation error $$F = (S - \hat{S})^2$$

the following error function is optimized $$I = (S - \hat{S})^2 + \beta \sum_{\varphi, \theta} \|c(\varphi, \theta)\| \quad [2]$$

The second term is the L1 norm of the c coefficients. By proper choice of $\beta$, the order of the decomposition can be chosen. A value of 0.0 means a full order decomposition (648 constituents in the example above), and a large value results in only few coefficients that are nonzero.

To solve the optimization problem [2], many methods can be used which are known to the skilled person. For example First Fit, Best Fit, Hill-climbing, etc. It is advantageous to do the computation in the frequency domain to avoid the convolution in [1]. The estimation of $\tau$ can be assisted by cross-correlating the measured signal with the direct sound colored by the respective $b(\varphi,\theta,t)$, or by explicitly sampling many possible values of $\tau$ in [1] (which is equivalent to increasing the number of coefficients that need to be estimated). Further, it is advantageous to analyze the low frequency, mid frequency and high frequency part of the tsp signal separately in order to gain robustness and obtain faster analysis speed by using the higher spatial aliasing frequency at lower frequencies.

As a result of the decomposition, the angle-dependent amplitude coefficients $c(\varphi, \theta)$ and the delays $\tau(\varphi, \theta)$ are obtained.

Based on the thus obtained angle-dependent amplitude coefficients $c(\varphi, \theta)$ and the corresponding delays $\tau(\varphi, \theta)$, a room geometry analysis can be performed. The angle-dependent amplitude coefficients $c(\varphi, \theta)$ can be interpreted as the attenuation function of the room wall reflections. That is, directions and delays of mirror sound sources can be obtained from the angle-dependent amplitude coefficients $c(\varphi, \theta)$ and the corresponding delays $\tau(\varphi, \theta)$. Each amplitude coefficient $c(\varphi, \theta)$ in the decomposition may be interpreted as corresponding to a mirror sound source in the direction $(\varphi, \theta)$ with a specific amplitude. Each angle-dependent amplitude coefficient provides a direction $(\varphi, \theta)$ of a mirror sound source, and the corresponding $\tau(\varphi, \theta)$ provides a respective delay attributed to the mirror sound source. In this way, a direction and a delay $\tau$ is obtained for each of the reflections from the room walls. The order of the decomposition (i.e. into how many basis functions the acoustic microphone signal is decomposed) can be chosen a priori to a reasonable number (e.g. up to two reflections for each of the six wall directions), or it can be dynamically found (e.g. by requesting a given amount of residual after the decomposition, or by specifying a fixed value of $\beta$ in the optimization of [2]).

From the directions and from the respective delays of the mirror sound sources, the locations of the mirror sound sources can be estimated (S4 in FIG. 6); from that and the known distance microphone to loudspeaker, wall points $Q_i$ and the normal vectors of the walls $n_i$ can be estimated and its distance from the microphone. For a cuboid room, with six normals and six distances, the problem of the room size estimation is essentially solved. An example of a room geometry estimation process is described with regard to FIG. 7.

Additional constraints, like e.g. the suppression of spurious reflections from furniture etc. may be added to improve the robustness of the approach.

The transfer functions $b(\varphi, \theta, t)$ of the metamaterial segments can be measured in advance, for example in an anechoic chamber, for different impinging directions.

FIG. 6 is a flowchart visualizing a process for room geometry analysis. At S1, a loudspeaker emits a time-stretch pulse signal (tsp) as calibration signal. At S2, a sum signal S captured by microphone is obtained. At S3, the directions $c_i$ and absolute values $\tau_i$ of delays are calculated by decomposing of the sound signal $\hat{S}$ based on the direct calibration signal tsp(t) and based on the known transfer functions $b_i$. At S4, wall points $Q_i$ and normal vectors $n_i$ are determined based on the directions $c_i$ and the absolute values $\tau_i$ of delays.

Figure 7A:
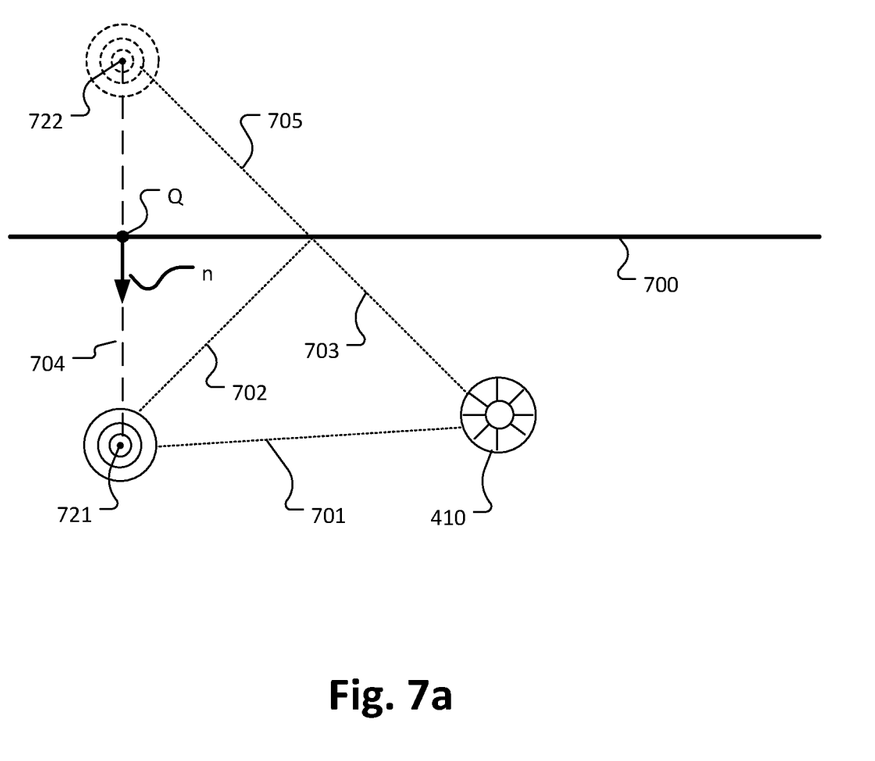
FIGS. 7*a* and 7*b* visualize the process of room geometry estimation based on the analysis of mirror sound sources that constitute mirror images of the calibration signal.
Figure 7B:
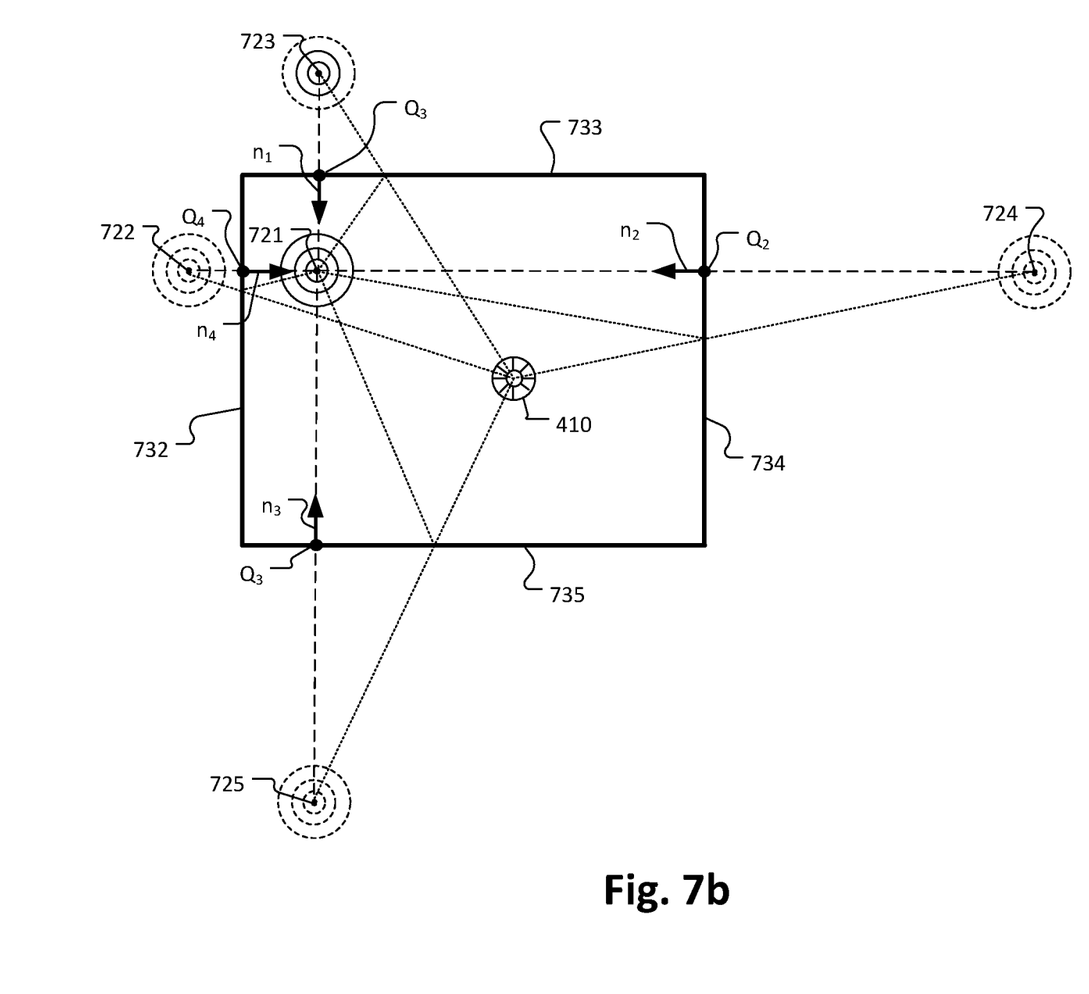

FIGS. 7a and 7b visualize the process for room geometry estimation based on the analysis of mirror sound sources that constitute mirror images of the calibration signal.

In FIG. 7a the process for room geometry estimation is described for the example of a single wall. A speaker 721 emits a calibration signal. The calibration signal travels along a direct path 701 to a metamaterial device 410. Still further, the calibration signal travels along a second path 702 to a wall 700 and is reflected at the wall 700. The signal travels along path 703 to the metamaterial device 410. For the microphone in the metamaterial device it appears as if the reflected signal would be emitted by a mirror sound source 722. Decomposing the sound signal to obtain direction $c_i$ and the absolute values $\tau_i$ of the mirror sound source, the process can determine the location the mirror sound source 722 of speaker 721. Wall 700 can be treated as a mirror plane. The geometry of wall 700 is determined based on the location of speaker 721 and the location of mirror sound source 722. A point Q on the previously unknown wall 700 can be determined by directly connecting the location of the speaker 721 and the location of the mirror sound source 722 by a line 704 and bisecting the line 704. Line 704 also defines the direction of the normal vector n of wall 700. With wall point Q and corresponding normal vector n the geometry of wall 700 has been determined.

In FIG. 7b the room geometry estimation process is described for the example of a room with four walls 732, 733, 734, 735. The room is displayed as seen from above. For simplification, the ceiling and the floor of the room are omitted and the process is explained in two dimensions only. A speaker 721 emits a calibration signal that travels along a direct path to the metamaterial device 410. The calibration signal is reflected on the four walls 732, 733, 734, 735 of the room to produce four mirror sound sources 722, 723, 724, 725. The microphone in the metamaterial device 410 captures the direct sound of the speaker 721 and the reflected sound, i.e. the sound that can be attributed to the four mirror sound sources 722, 723, 724, 725. By directly connecting the location of the speaker 721 with the location of the respective mirror sound source 722, 723, 724, 725 four wall points $Q_1, Q_2, Q_3, Q_4$ and their normal vectors $n_1, n_2, n_3, n_4$ can be determined. With knowledge of all wall points and their normal vectors the geometry of the room has been determined.

It should be mentioned that in the case of more than one wall there are reflections of higher order visible to the metamaterial device 410. As mentioned earlier, the algorithm weights the first order reflections most, making the approximation of having only first order reflections.

The same principle can be also used for more than four walls, for example six walls (also floor and ceiling) in three dimensions or more (more complex room geometry, than cuboid geometry). Basically for each wall there will be one first order reflection, therefore the number of first order reflections can be used for counting the number of walls in the room.

Note that the present technology can also be configured as follows:

[1] A device for room geometry analysis comprising:
a plurality of segments (101-106) built of acoustic metamaterials, each segment $(\varphi, \theta)$ acting as a waveguide with a unique transfer function $(B(\varphi, \theta, \omega))$; and
a processor configured to calculate delays $(\tau(\varphi, \theta))$ and respective directions $(\varphi, \theta)$ of mirror sound sources (721-725) by decomposing a sound signal $(\hat{S})$ obtained from a microphone (110) based on the transfer functions $(B(\varphi, \theta, \omega))$ of the segments (101-106) and based on a calibration signal $(tsp(t))$ emitted by a speaker (420).

[2] The device of [1], wherein the processor is configured to determine, for each delay $(\tau(\varphi, \theta))$ and the respective direction $(\varphi, \theta)$, the location of a mirror sound source (722-725) based on the delay $(\tau(\varphi, \theta))$ and the respective direction $(\varphi, \theta)$.

[3] The device of [1] or [2], wherein the processor is configured to determine a normal vector (n) of a wall and a wall point (Q) based on the location of the mirror sound sources (722-725) and the location of the loudspeaker (701).

[4] The device of anyone of [1] to [3], wherein the processor is configured to determine the directions $(\varphi, \theta)$ from angle-dependent amplitude coefficients $(c(\varphi, \theta))$ of the sound signal (g).

[5] The device of anyone of [1] to [4], in which the calibration signal has a flat spectral density.

[6] The device of anyone of [1] to [5], in which the calibration signal is a time-stretch pulse signal (tsp).

[7] The device of anyone of [1] to [6], wherein the processor is configured to decompose the sound signal $(\hat{S})$ based on compressive sensing (CS) techniques.

[8] The device of anyone of [1] to [7], wherein the processor is configured to decompose the sound signal $(\hat{S})$ based on the minimization of the L1 norm of the sound signal (g).

[9] The device of anyone of [1] to [8], wherein the processor is configured to decompose the sound signal $(\hat{S})$ based on the formula $$\hat{S} = \sum_{\varphi,\theta} c(\varphi, \theta)(tsp(t - \tau(\varphi, \theta)) * b(\varphi, \theta, t))$$

wherein $c(\varphi, \theta)$ are angle-dependent amplitude coefficients that represent the attenuation function of the room wall reflections, $tsp(t)$ is the calibration signal, $\tau(\varphi, \theta)$ is the delay, $b(\varphi, \theta, t)$ is the transfer function in time-domain, * is a convolution operation and $(\varphi, \theta)$ are polar and azimuthal coordinates referring to the segments. The sum $\Sigma_{\varphi,\theta}$ is performed over all segments with coordinates $(\varphi, \theta)$.

[10] The device of [9], wherein the processor is configured to optimize the following error function:

$$I = (S - \hat{S})^2 + \beta \sum_{\varphi,\theta} \|c(\varphi, \theta)\|$$

wherein I is the error function that is minimized, S is the numerical function that is fitted, $c(\varphi, \theta)$ are angle-dependent amplitude coefficients, $\beta$ is a predefined coefficient that influences the order of the decomposition, $\Sigma_{\varphi,\theta}\|c(\varphi, \theta)\|$ is the sum of the L1 norms of the c coefficients over all segments $(\varphi, \theta)$.

[11] The device of anyone of [1] to [10], wherein the processor is configured to decompose the sound signal $(\hat{S})$ based on additional constraints.

[12] The device of anyone of [1] to [11] in which at least one of the segments (301-304) is a Helmholtz resonator.

[13] The device of anyone of [1] to [12], in which the segments (101-106) are arranged around the microphone (110) in a cylindrical, spherical, circular, cubic, cuboid or planar shape.

[14] A system comprising the device of claim 1 and a speaker (420), the speaker being configured to emit a calibration signal $(tsp(t))$.

[15] A method comprising:
emitting a calibration signal $(tsp(t))$;
obtaining a sound signal (S);
calculating delays $(\tau(\varphi, \theta))$ and respective directions $(\varphi, \theta)$ of mirror sound sources (721-725) by decomposing the sound signal $(\hat{S})$ based on the transfer functions $(B(\varphi, \theta, \omega))$ of a plurality of segments (101-106) and based on the calibration signal $(tsp(t))$, the segments (101-106) built of acoustic metamaterials, each segment $(\varphi, \theta)$ acting as a waveguide with a unique transfer function $(B(\varphi, \theta, \omega))$.

[16] A program comprising instructions, which when executed on a processor:
emit a calibration signal $(tsp(t))$;
obtain a sound signal (s);
calculate delays $(r(\varphi, \theta))$ and respective directions $(\varphi, \theta)$ of mirror sound sources (721-725) by decomposing the sound signal (S) based on the transfer functions $(B(\varphi, \theta, \omega))$ of a plurality of segments (101-106) and based on the calibration signal $(tsp(t))$, the segments (101-106) built of acoustic metamaterials, each segment $(\varphi, \theta)$ acting as a waveguide with a unique transfer function $(B(\varphi, \theta, \omega))$.

[17] A tangible computer-readable medium storing instructions, which when executed on a processor:
emit a calibration signal $(tsp(t))$;
obtain a sound signal $(\hat{S})$;
calculate delays $(\tau(\varphi, \theta))$ and respective directions $(\varphi, \theta)$ of mirror sound sources (721-725) by decomposing the sound signal (Ŝ) based on the transfer functions (B(φ, θ, ω)) of a plurality of segments (101-106) and based on the calibration signal (tsp(t)), the segments (101-106) built of acoustic metamaterials, each segment (φ, θ) acting as a waveguide with a unique transfer function (B(φ, θ, ω)).

LIST OF REFERENCE SIGNS 100 metamaterial device (metamaterial device)
101 segment consisting of acoustic metamaterial
102 segment consisting of acoustic metamaterial
103 segment consisting of acoustic metamaterial
104 segment consisting of acoustic metamaterial
105 segment consisting of acoustic metamaterial
106 segment consisting of acoustic metamaterial
110 microphone
$f_A$ frequency modulation amplitude
f frequency
201 transfer function for segment 101
202 transfer function for segment 102
300 3D spherical MMD
301 3D segment
302 3D segment
303 3D segment
304 3D segment
401 direct sound path (loudspeaker metamaterial device)
402 first reflection sound path with reflection on lower wall (loudspeaker lower wall metamaterial device)
403 first reflection sound path with reflection on back wall (loudspeaker back wall metamaterial device)
404 first reflection sound path with reflection on upper wall (loudspeaker upper wall metamaterial device)
405 higher reflection order sound path with reflection on more than one wall
410 metamaterial device (metamaterial device)
420 loudspeaker emitting white noise
501 static volume of the cavity $V_0$
502 neck of the resonator
503 cross sectional area of the neck
504 sound emitter
511 resonance peak of Helmholtz resonator shown in FIG. 5a
S1 step "emit calibration signal"
S2 step "obtain sum signal"
S3 step "calculate delays"
S4 step "determine wall points"
S5 step "determine normal vectors"
700 wall
701 direct path speaker—MMD
702 path speaker—wall
703 path wall—MMD
704 connection line speaker and mirror sound source
705 mirror path
721 speaker
722 mirror sound source
Q wall point
n wall normal vector
a distance speaker—wall
a' distance mirror sound source—wall
722 mirror sound source
723 mirror sound source
724 mirror sound source
725 mirror sound source
732 wall
733 wall
734 wall
735 wall
$Q_1$ wall point
$Q_2$ wall point
$Q_3$ wall point
$Q_4$ wall point
$n_1$ wall normal vector
$n_2$ wall normal vector
$n_3$ wall normal vector
$n_4$ wall normal vector

The invention claimed is:

1. A device for room geometry analysis comprising:
a plurality of segments built of acoustic metamaterials, each segment acting as a waveguide with a unique transfer function; and
a processor configured to calculate delays and respective directions of mirror sound sources by decomposing a sound signal obtained from a microphone based on the transfer functions of the segments and based on a calibration signal emitted by a speaker,
wherein the mirror sound sources are mirror images of the calibration signal.

2. The device of claim 1, wherein the processor is configured to determine, for each delay and the respective direction, a location of a respective mirror sound source, of the mirror sound sources based on the delay and the respective direction.

3. The device of claim 1, wherein the processor is configured to determine the directions from angle-dependent amplitude coefficients of the sound signal.

4. The device of claim 1, in which the calibration signal has a flat spectral density.

5. The device of claim 1, in which the calibration signal is a time-stretch pulse signal.

6. The device of claim 1, wherein the processor is configured to decompose the sound signal based on compressive sensing techniques.

7. The device of claim 1, wherein the processor is configured to decompose the sound signal based on the minimization of the L1 norm of the sound signal.

8. The device of claim 1, wherein the processor is configured to decompose the sound signal based on additional constraints.

9. The device of claim 1, in which at least one of the segments is a Helmholtz resonator.

10. The device of claim 1, in which the segments are arranged around the microphone in a cylindrical, spherical, circular, cubic, cuboid or planar shape.

11. The device of claim 1, wherein the processor is further configured to estimate a room geometry using the decomposed sound signal.

12. A device for room geometry analysis comprising:
a plurality of segments built of acoustic metamaterials, each segment acting as a waveguide with a unique transfer function; and
a processor configured to:
calculate delays and respective directions of mirror sound sources by decomposing a sound signal obtained from a microphone based on the transfer functions of the segments and based on a calibration signal emitted by a speaker; and
determine a normal vector of a wall and a wall point based on locations of the mirror sound sources and a location of the speaker.

13. A device for room geometry analysis comprising:
a plurality of segments built of acoustic metamaterials, each segment acting as a waveguide with a unique transfer function; and a processor configured to:
calculate delays and respective directions of mirror sound sources by decomposing a sound signal obtained from a microphone based on the transfer functions of the segments and based on a calibration signal emitted by a speaker; and
decompose the sound signal ($\hat{S}$) based on the formula $$\hat{S} = \sum_{\varphi,\theta} c(\varphi, \theta)(tsp(t - \tau(\varphi, \theta)) * b(\varphi, \theta, t))$$

wherein $c(\varphi, \theta)$ are angle-dependent amplitude coefficients that represent the attenuation function of the room wall reflections, tsp(t) is the calibration signal, $\tau(\varphi, \theta)$ is the delay, $b(\varphi, \theta, t)$ is the transfer function in time-domain, * is a convolution operation and $(\varphi, \theta)$ are polar and azimuthal coordinates refering to the segments. The sum $\Sigma_{\varphi,\theta}$ is performed over all segments with coordinates $(\varphi, \theta)$.

14. The device of claim 13, wherein the processor is configured to optimize the following error function:

$$I = (S - \hat{S})^2 + \beta \sum_{\varphi,\theta} \|c(\varphi, \theta)\|$$

wherein I is the error function that is minimized, S is the numerical function that is fitted, $c(\varphi, \theta)$ are angle-dependent amplitude coefficients $\beta$ is a predefined coefficient that influences the order of the decomposition, $\Sigma_{\varphi,\theta}\|c(\varphi,\theta)\|$ is the sum of the L1 norms of the c coefficients over all segments $(\varphi, \theta)$.

15. A method comprising:
emitting a calibration signal;
obtaining a sound signal;
calculating delays and respective directions of mirror sound sources by decomposing the sound signal based on the transfer functions of a plurality of segments and based on the calibration signal, the segments built of acoustic metamaterials, each segment acting as a waveguide with a unique transfer function,
wherein the mirror sound sources are mirror images of the calibration signal.

16. A non-transitory computer readable medium comprising instructions, which when executed on a processor:
emit a calibration signal;
obtain a sound signal;
calculate delays and respective directions of mirror sound sources by decomposing the sound signal based on the transfer functions of a plurality of segments and based on the calibration signal, the segments built of acoustic metamaterials, each segment acting as a waveguide with a unique transfer function,
wherein the mirror sound sources are mirror images of the calibration signal.

* * * * *